United States Patent [19]

Morel et al.

[11] Patent Number: 5,428,785
[45] Date of Patent: Jun. 27, 1995

[54] DISTRIBUTED COMPUTER SYSTEM LOG-ON DEVICE FOR STORING AND RETRIEVING A USER'S VIEW OF OBJECTS AT LOG-OFF

[75] Inventors: William Morel, Redmond, Wash.; Hugh Duggan, Bristol, Great Britain

[73] Assignee: Hewlett-Packard Company, Palo Alto, Calif.

[21] Appl. No.: 778,837

[22] PCT Filed: Apr. 30, 1991

[86] PCT No.: PCT/GB91/00688
§ 371 Date: Mar. 20, 1992
§ 102(e) Date: Mar. 20, 1992

[87] PCT Pub. No.: WO91/17502
PCT Pub. Date: Nov. 14, 1991

[30] Foreign Application Priority Data

Apr. 30, 1990 [GB] United Kingdom ............... 9009703

[51] Int. Cl.⁶ .............................................. G06F 13/14
[52] U.S. Cl. .................... 395/700; 364/242.94; 364/280; 364/281.3; 364/286.5; 364/DIG. 1
[58] Field of Search ........... 395/575, 700, 650; 364/242.94, 280, 281.3, 286.5

[56] References Cited

U.S. PATENT DOCUMENTS 4,907,150  3/1990  Arroyo et al. ................. 395/575
4,980,836 12/1990  Carter et al. ................... 364/483

FOREIGN PATENT DOCUMENTS 0300516   1/1989  European Pat. Off. .
01280819 11/1989  Japan .

OTHER PUBLICATIONS

"Suspending and Resuming the Execution of an Expert System", IBM Technical Disclosure Bulletin, vol. 28, No. 7, December 1985, pp. 3187–3188.
"Displaywrite 4 Profile Initialization During Installation", IBM Technical Disclosure Bulletin, vol. 30, No. 9, Feb. 1988, p. 169.

*Primary Examiner*—Gareth D. Shaw
*Assistant Examiner*—Dennis M. Butler

[57] ABSTRACT

The disclosed invention is directed to a computer system comprising a log-on device, which at log-off records information defining the user's activity (e.g., the user's view of objects displayed on his display terminal), and, at log-on, automatically restores the system to the situation extant at log-off. The storage device on which the object view data is stored is removable, whereby the user may carry it from one terminal to another.

16 Claims, 3 Drawing Sheets

DISTRIBUTED COMPUTER SYSTEM LOG-ON DEVICE FOR STORING AND RETRIEVING A USER'S VIEW OF OBJECTS AT LOG-OFF

The invention relates to an arrangement for facilitating the log-on process to a computer system. Although not limited to such, the invention finds particular application in object based computer systems.

Object based computer systems facilitate multi-tasking and multi-user operations where common data files may be accessed concurrently by different tasks operated from the same terminal or operated by different users employing respective terminals. A windows environment is generally employed in conjunction with an object based system to enable windows to be allocated to respective concurrent tasks. There follows an overview of an object based system in a windows environment which will help define terms used herein.

An OBJECT is a combination of data and method code which is normally stored on disk. An object may be INACTIVE, when it is identified simply as a disk file, or ACTIVE, when it has a PROCESS, or executable file, associated with it. When active, at least parts of the object are held in the computer RAM and the object is defined by the state of the associated process rather than by its file.

Objects can be LINKED to other objects so that changes in one are reflected in the object or objects with which it is linked by virtue of MESSAGES which are passed between the linked objects. The system is controlled by an OBJECT MANAGER which is an application running in the windows environment and which controls activation and deactivation of objects, and the passage of messages between objects.

An object is sometimes a CONTAINER which contains as notional parts other objects. Examples of container objects in a distributed office system are a desktop, folder and a document. A VARIABLE DIMENSION DATA OBJECT (VDO) is a data store of which the values of elements may be viewed and changed directly by a user.

Objects may be split between a SEMANTIC part (which defines the state of the object) and a PRESENTATION part (for presenting to a user the state of the object). Indeed, conceptually one can think of there being separate semantic objects and presentation objects. In addition, when using a windows user interface, there are windows for viewing objects and facilitating multi-tasking. In this specification, the presentation part or presentation object is something which is utilised by a window and forms part of the window for the time in which the window is viewing the object in question and generally a distinction between the window and the presentation part or object will not be made.

Semantic objects have data stored in a particular storage domain. A storage domain may be regarded as closely equivalent to a storage medium such as a hard disc or floppy disc in the sense that all objects in a given storage domain are on-line together or are off-line together. Consequently, a single machine may support a plurality of storage domains.

The present invention could be applied in a single computer having one or more storage domains but is primarily concerned with an object based system having a plurality of user stations. Such a system may be provided by a single central processing device having a plurality of user stations coupled to it, or it may be provided by a distributed processing network consisting of a number of independent processing units each having a respective station associated with it. In the system of the present invention an object has an implicit presentation, which will look the same however viewed.

It is possible to open one or more windows on each object. The windows manage the display and input/output (lexical) interaction in the system. The user of multiple windows in conjunction with an object enables employment of the techniques of sharing (multiple windows to a common object) and distributed (window on one machine and object on another) applications.

We define a VIEWER as an object which allows users to access other objects by providing the appearance of the object to the user and accepting user input for data manipulation. Viewers have hitherto been known as TASK WINDOWS, but a window is part only of the viewer. The object being viewed controls its own state and provides the methods for access to and manipulation of that state.

On logging-on an operator can choose between a number of tasks and may have a number of selections to make in a menu driven system. Also, he may be able to choose various attributes such as screen color and nature of a title bar, etc. Very often an operator has a preferred selection of screen attributes and over a certain period of time he will be working at a particular task. In an object based system he will have activated certain objects and opened certain windows as viewers. In logging-on to the system an operator will often follow the same procedure particular to himself. The present invention recognises this and provides a system for facilitating log-on.

According to the invention there is provided a computer system comprising a computer having stored data; at least one terminal whereby a user may gain access to interrogate the data; a read/write unit associated with the or each terminal for reading from and writing to a removable storage element, the computer being programmed to respond to the storage element as a log-on device, to record thereon details of the user's activity on log-off and on the next log-on to respond to the stored activity information automatically to restore the user to the situation corresponding to the last log-off.

Preferably the storage element is a card and the storage medium magnetic. However, alternative arrangements include a 'smart card' where the information is stored in a battery-maintained RAM or an erasable or non-erasable optical storage medium using a laser read/write unit.

Particular application for the invention is found in an object based distributed office system run under a windows environment. Such a system may be very extensive since modern telecommunications facilities allow nationwide and even international computer networks to be established. Conventionally, a user is associated with a particular terminal and therefore a particular domain. His own files, including his desk-top are located in that domain. However, it is possible to allocate each object in the system a unique identifier and by recording the identifiers of the objects used in his last session on the storage element it is possible for a user to re-enter his usual environment from wherever he is. This is a principal advantage of the present invention.

In a preferred embodiment a set of networked personal computers each has a magnetic card read/write unit. Each user has a personal information card (PIC) which has a magnetic stripe. The PIC carries information about the user—for example, name and/or identification number. It may also carry reference to a code number which the user is required to type in to gain access. All of this information is magnetically recorded on the stripe. In addition there is log-on information which has been derived from the user situation at last log-off. This information includes windows identifiers which specifically designate the windows in use at the time of last log-off and, for each window, the size and extent of the window, the object identifiers for the objects being viewed and the positions of the objects in the window. Typically the data storage requirement for each window may be 50 bytes or so. In addition there is a system window which governs color selection and other general attributes and parameters. This information may account for 200–300 bytes.

At log-off all this information is stored on the magnetic stripe so that the program reads the personal information when the user logs on again and the required set of windows is recreated. The appropriate objects are linked to the respective windows.

Clearly, it is possible for the operator to proceed from that situation to another should he wish to do so, perhaps having finished his previous task. Then the new situation at log-off is recorded for the next log-on.

The invention will further be described with reference to the accompanying drawings of which:

FIG. 3 is a schematic diagram of program procedures in the system involved with logging-in.

Figure 1:
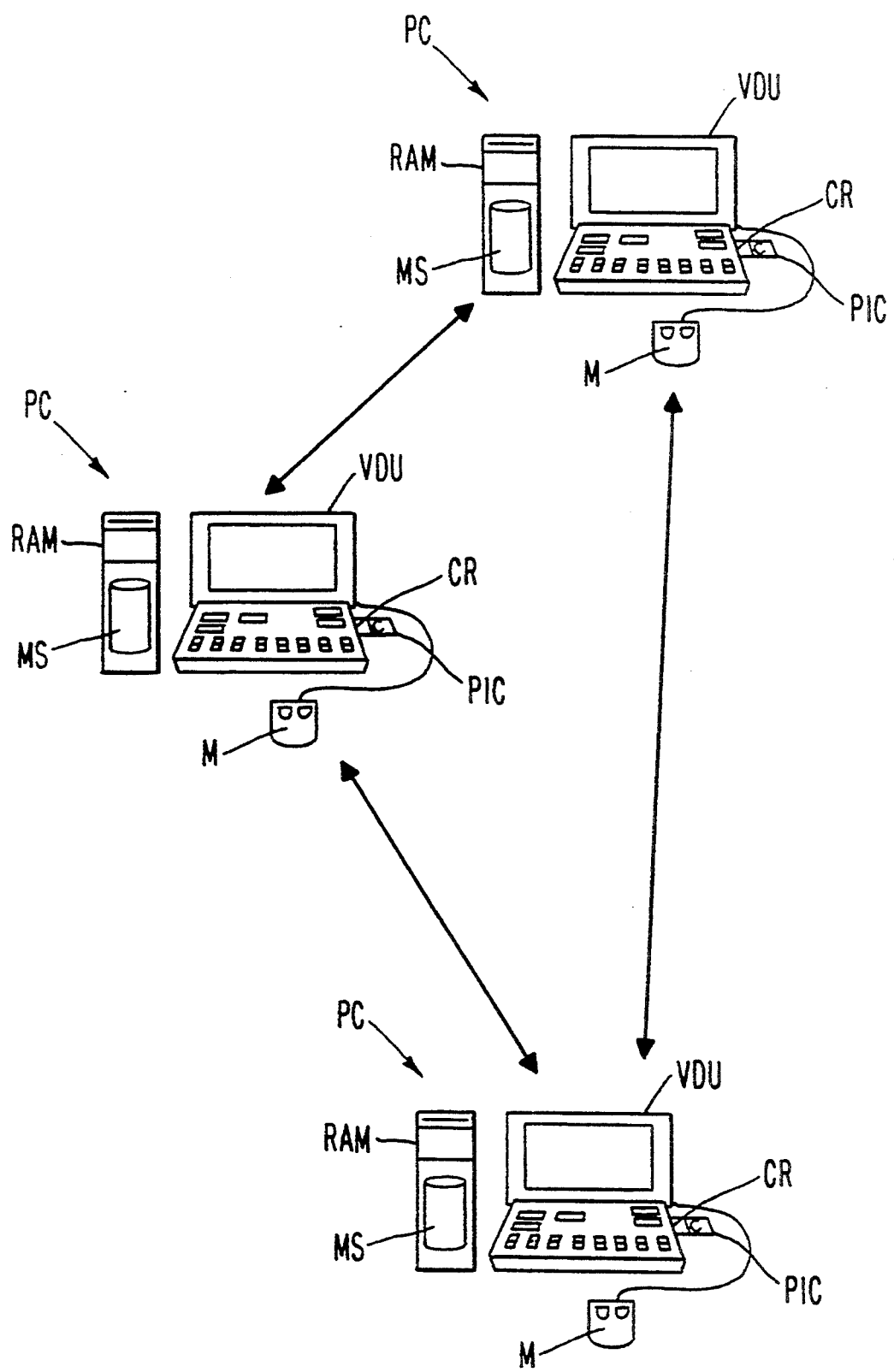
FIG. 1 is a schematic diagram of an object based computer system embodying the invention.

Referring to FIG. 1 there is shown an object based computer system which comprises a network of personal computers PC, each of which has a central processor unit CPU; random access memory RAM; mass storage facilities MS; a visual display unit VDU and a mouse M. In the drawing these units are designated for one computer only. Each computer also has a card reader CR.

Figure 2:
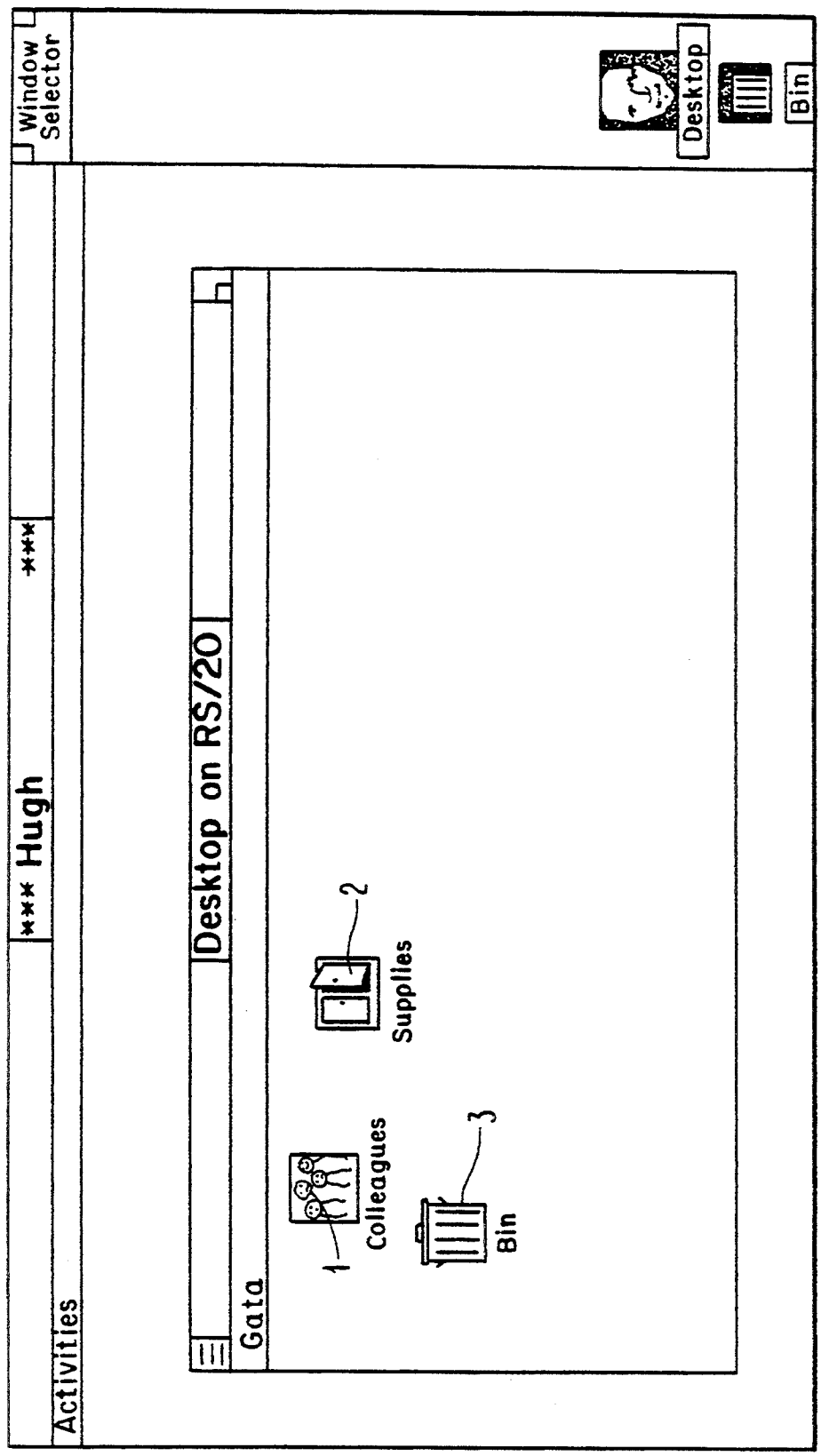
FIG. 2 is a diagram of a viewer presentation in the system of FIG. 1.

The mass storage facilities MS constitute domains in the system which are generally associated with the user or users who habitually use that computer. Thus, objects associated with those users are stored there. These objects include, for example, the desk top objects for each habitually local user. FIG. 2 shows a typical viewer presentation showing the desk top of a user. This designates the user—in this case "Hugh" and has icons 1, 2 and 3 for the user's objects "Colleagues"; "Supplies" and "Bin". The desk top is represented in a window with particular colors, position and size.

The card readers of FIG. 1 are used to read from and write to Personal Identification Cards (PIC) which have a magnetic stripe. In logging off, the card has written to it the following data with the approximate number of bytes shown in parentheses:

| | |
|---|---|
| Home Context (Desktop) Object identifier | (4) |
| Supplies Object identifier | (4) |
| Bin Object identifier | (4) |
| Number of windows | (2) |
| Window data (size, position, colour and object viewed) | (100) |
| User name | (2) |
| System colours | (60) |

When the user next comes to use the system he inserts his card in the reader and the data is read from it in order to re-establish the conditions as they were at last log-off.

Figure 3:
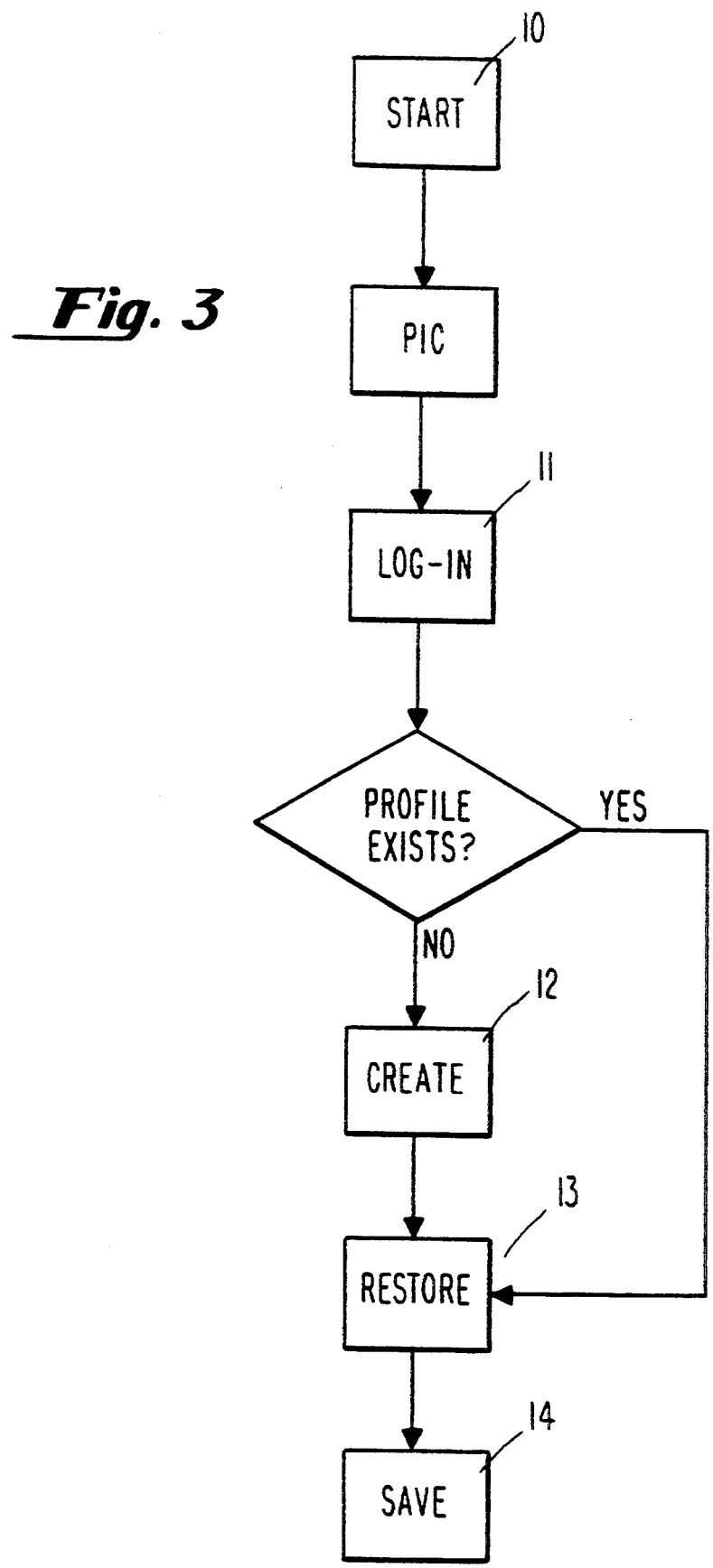

FIG. 3 is a schematic diagram of program procedures associated with the log-on process. A start procedure 10 sets up a dialogue box on the VDU when the unit is switched on. This allows the user to inset a card in the reader and elect to log on. Logging in invokes a log-in procedure 11 which takes the data in a message sent by the reader and determines whether the user profile exists. If the user profile does not exist (or the card is a fresh blank card) the user is invited to create a profile by invoking a create procedure 12. The user may enter his name and a password and the log-on will continue.

If the user profile already exists the log-on continues and a restore procedure 13 takes the data read from the card and calls up the objects necessary by reference to their unique identifiers in the system. An important feature of the invention is the nature of the object identifiers. When an object is created and saved in a particular domain it is accessible to any terminal in the system linked to the terminal of that domain. The arrangement is that each terminal (domain) of the system has a unique identifier and each object stored in that domain has a unique sequence number. The combination of the domain identifier and sequence number gives the unique object identifier. When an object is moved between domains it is cancelled from one and added to the other, so that there is no confusion about its location or identifier.

The converse of the restore function is the save function which is implemented by a save procedure 15 invoked on log-off. Log-off is selected by menu and the current window and object identifiers etc are saved to the card via the reader.

The invention is not restricted to the details of the embodiment described above with reference to the drawings. For example, the removable storage device may take many forms, including a floppy disk.

What is claimed is:

1. A distributed object-based computer system comprising a computer having stored data; at least one terminal whereby a user may gain access to interrogate the data; a storage device for storing objects that have unique object identifiers; a read/write unit operatively coupled to the terminal for reading from and writing to a removable storage element, the computer being programmed to respond to the storage element as a log-on device, to record thereon information defining the user's view of objects displayed on said terminal on log-off and on a next log-on to respond to the stored information automatically to restore the view of objects corresponding to the last log-off, said information including at least the object identifiers of those objects to which the user's view was linked on log-off.

2. A computer system as claimed in claim 1 wherein each object identifier comprises a unique identifier of the domain in which it is stored in combination with a unique sequence number of the domain.

3. A computer system as claimed in claim 1 wherein the information stored on the storage element further includes data concerning window size, position and colour.

4. A computer system as claimed in claim 1 wherein the reader is a magnetic card reader and the user's activity details are stored on magnetic cards.

5. A computer system as claimed in claim 2 wherein the information stored on the storage element further includes data concerning window size, position and colour.

6. A computer system as claimed in claim 3 wherein the reader is a magnetic card reader and the user's activity details are stored on magnetic cards.

7. A computer system comprising processing means, means for storing data, at least one input/output means for gaining access to stored data, at least one removable storage element, and a respective read/write unit operatively coupled to said at least one input/output means, said read/write unit being connected to said processing means and serving to read and write to a said removable storage element; said processing means comprising means for performing the following functions:
   to record on a said removable storage element via a said read/write unit, user information indicative of a user's view of objects reached by a user working at the corresponding input/output means of said system, upon log-off of the user from the system, and
   to treat that removable storage element as a log-on device for logging on the associated user following the re-insertion of that removable storage element into a said read/write unit, the processing means using said user information stored on the storage element to restore a corresponding view on the input/output means associated with the read/write unit into which the storage element has been inserted.

8. A computer system according to claim 7, comprising a plurality of computers and a network interconnecting said computers, each said computer being operatively coupled to a respective said input/output means and a respective said read/write unit, and said processing means being distributed between said computers.

9. A computer system as claimed in claim 7, wherein said system is an object based system including stored viewer data defining viewer objects through which users can access said data, and wherein objects of the system have unique identifiers, wherein details of the user's situation include the object identifiers of those objects to which the user's view was linked on log-off.

10. A computer system as claimed in claim 9, wherein said means for storing data is logically divided into storage domains, each said object identifier comprising a unique identifier of the domain in which it is stored in combination with a unique sequence number of the domain.

11. A computer system as claimed in claim 9, wherein information concerning view size, position and color is stored on said removable storage device on log-off and is used on log-on to effect viewer restoration.

12. A computer system as claimed in claim 7, wherein said removable storage elements are magnetic cards and said read/write units are magnetic card units.

13. A computer system as claimed in claim 8, wherein said removable storage elements are magnetic cards and said read/write units are magnetic card units.

14. A computer system as claimed in claim 9, wherein said removable storage elements are magnetic cards and said read/write units are magnetic card units.

15. A computer system as claimed in claim 10, wherein said removable storage elements are magnetic cards and said read/write units are magnetic card units.

16. A computer system as claimed in claim 11, wherein said removable storage elements are magnetic cards and said read/write units are magnetic card units.

* * * * *